United States Patent
Fuehrer

(10) Patent No.: US 9,915,538 B2
(45) Date of Patent: Mar. 13, 2018

(54) METHOD FOR OPERATING A VEHICLE

(71) Applicant: Robert Bosch GmbH, Stuttgart (DE)

(72) Inventor: Thomas Fuehrer, Stuttgart-Weilimdorf (DE)

(73) Assignee: ROBERT BOSCH GMBH, Stuttgart (DE)

( * ) Notice: Subject to any disclaimer, the term of this patent is extended or adjusted under 35 U.S.C. 154(b) by 429 days.

(21) Appl. No.: 14/527,492

(22) Filed: Oct. 29, 2014

(65) Prior Publication Data

US 2015/0120190 A1    Apr. 30, 2015

(30) Foreign Application Priority Data

Oct. 31, 2013  (DE) .................. 10 2013 222 182

(51) Int. Cl.
*G01C 21/00* (2006.01)
*G01C 21/34* (2006.01)
*G01C 21/26* (2006.01)
*G01C 21/36* (2006.01)
*G05D 1/02* (2006.01)

(52) U.S. Cl.
CPC ............ *G01C 21/34* (2013.01); *G01C 21/26* (2013.01); *G01C 21/3407* (2013.01); *G01C 21/3602* (2013.01); *G05D 1/0234* (2013.01); *G05D 1/0278* (2013.01); *G05D 2201/0213* (2013.01)

(58) Field of Classification Search
CPC .......................... G01C 21/26; G01C 21/3407; G01C 21/3602; G05D 1/0234
USPC ......................................................... 701/522
See application file for complete search history.

(56) References Cited

U.S. PATENT DOCUMENTS

| 8,903,616 B2 * | 12/2014 | Fehse ..................... | G08G 1/168 340/518 |
| 2002/0147543 A1 * | 10/2002 | Gieseke ................... | G08G 1/14 701/532 |
| 2014/0375811 A1 * | 12/2014 | Nordbruch ................ | G09F 9/30 348/148 |

* cited by examiner

*Primary Examiner* — Muhammad Shafi
(74) *Attorney, Agent, or Firm* — Gerard Messina

(57) ABSTRACT

In a method for operating a vehicle, a location assigned to a driving route of the vehicle is transmitted from the vehicle to an external server, and the server checks whether a zone is assigned to the transmitted location for which navigation data exist for at least partially automated vehicle driving within the zone. The navigation data are transmitted from the server to the vehicle when such a zone is assigned to the transmitted location.

8 Claims, 3 Drawing Sheets

METHOD FOR OPERATING A VEHICLE

BACKGROUND OF THE INVENTION

1. Field of the Invention

The present invention relates to a method and to a device for operating a vehicle. The present invention further relates to a computer program.

2. Description of the Related Art

It is known that a vehicle is able to drive at least partially automated within a certain zone, for example a parking garage. For this purpose, a driver must generally carry out one or multiple training drives in the zone with the vehicle. Without such a training drive, an at least partially automated vehicle driving is generally not possible.

Consequently, there is a need for a vehicle to also be able to drive at least partially automated in a predetermined zone without such training drives.

BRIEF SUMMARY OF THE INVENTION

It is therefore the object of the present invention to provide a method for operating a vehicle which overcomes the known drawbacks and allows an at least partially automated vehicle driving in a predetermined zone, even without the vehicle previously having to have completed a training drive in the zone.

It is another object of the present invention to provide a method for operating a vehicle including a sensor device for detecting vehicle surroundings, which overcomes the known drawbacks and allows other vehicles to drive at least partially automated within the zone, without these other vehicles previously having to have completed a training drive in the zone.

It is another object of the present invention to provide a corresponding device for operating a vehicle.

It is also an object of the present invention to provide a corresponding computer program.

According to one aspect, a method for operating a vehicle is provided, a location assigned to a driving route of the vehicle being transmitted from the vehicle to an external server, the server checking whether a zone is assigned to the transmitted location for which navigation data exist for at least partially automated vehicle driving within the zone, the navigation data being transmitted from the server to the vehicle when such a zone is assigned to the transmitted location. This vehicle may be referred to hereafter as the second vehicle.

According to another aspect, a method for operating a vehicle including a sensor device for detecting vehicle surroundings is provided, the vehicle surroundings being detected with the aid of the sensor device while the vehicle is driving in a zone assigned to a location, navigation data for at least partially automated vehicle driving within the zone being formed based on the detected vehicle surroundings, after the vehicle has driven within the zone, and being transmitted from the vehicle to an external server. This vehicle may be referred to hereafter as the first vehicle.

According to yet another aspect, the two aforementioned methods may be combined in a shared method. For better distinction, the vehicle which detects the zone with the aid of the sensor device and transmits the navigation data to the external server may be referred to as the first vehicle, as was already defined above. The vehicle which receives navigation data from the server may be referred to as the second vehicle, as was already defined above.

According to one further aspect, a device for operating a vehicle is provided, the device being configured to carry out the method for operating a vehicle.

According to yet another aspect, a computer program is provided, which includes program code for carrying out the method for operating a vehicle if the computer program is run on a computer.

The present invention thus in particular includes the idea to transmit navigation data from an external server to a vehicle, these navigation data being formed in such a way that at least partially automated vehicle driving within the zone is possible based on these data. The present invention in particular includes the idea that, after a vehicle has driven in a zone, the vehicle detects the surroundings of the vehicle with the aid of a sensor device during this drive, to form navigation data based on the detected vehicle surroundings and to transmit these data to an external server. In this way, these navigation data may advantageously also be made available by the external server to other vehicles which have not traveled the zone yet.

By transmitting navigation data for at least partially automated vehicle driving from an external server to a vehicle, this vehicle is thus able to travel the zone at least partially automated. This is possible in particular even if the vehicle itself previously never traveled the zone, i.e., has no knowledge of the infrastructure and/or the topography of the zone. Based on the transmitted navigation data, it is thus possible for the vehicle to be driven at least partially automated within the zone.

The present invention thus in particular includes the idea to send a recorded training drive of a vehicle within a zone (drive of the vehicle within the zone) to an external server. This server may then transmit the training drive to further vehicles, so that these gain knowledge about the zone and they are able to drive at least partially automated within the zone.

The wording "at least partially automated vehicle driving" includes in particular fully automated vehicle driving. Partially automated vehicle driving generally still requires an intervention by a driver into vehicle driving. Such an intervention is generally no longer required in the case of fully automated vehicle driving.

The sensor device detects the vehicle surroundings while the vehicle is driving within the zone. Here it may in particular be provided that vehicle driving is recorded during driving. This means in particular that vehicle maneuvers are recorded. Together with the vehicle driving, for example, positioning of an instantaneous vehicle position within the zone may be carried out, so that it is possible to also record in this way which vehicle maneuvers were carried out at which point or at which position in the zone.

According to one specific embodiment, it may be provided that the server transmits a sensor image of surroundings of the location to the vehicle, a sensor image of vehicle surroundings recorded with the aid of a sensor device of the vehicle being compared to the transmitted sensor image to be able to recognize, based on the comparison, when the vehicle is situated in the surroundings of the location.

According to one specific embodiment, it may be provided that the sensor device of the vehicle records a sensor image of surroundings of the location and the sensor image is transmitted from the vehicle to the server.

In this way, a vehicle which itself had not yet been in the surroundings of the location may advantageously be enabled to recognize whether or not it is situated in the surroundings of the location.

In this way, the accuracy and reliability in the determination of the location may advantageously be improved. This is in particular advantageous when no or only weak GPS signals are present, for example in a tunnel.

According to one further specific embodiment, it may be provided that the transmitted sensor image includes a piece of information on the direction, relative to the location, from which the transmitted sensor image was recorded, the information being used during the comparison.

According to still another specific embodiment, it may be provided that a recording direction of the sensor device relative to the location is determined and added to the sensor image, so that the sensor image includes the piece of information on the direction, relative to the location, from which the sensor image was recorded.

In this way, different recording directions of the respective sensor images may advantageously be taken into consideration. In particular, for example, perspective distortions may advantageously be compensated for. This may advantageously increase the recognition rate. In particular, a false recognition rate or a false positive recognition rate may advantageously be reduced.

According to one further specific embodiment, it may be provided that the server transmits a position of an element in the surroundings of the location to the vehicle, the element identifying an entrance location into the zone.

According to one further specific embodiment, it may be provided that, prior to the vehicle entering the zone, an element in the surroundings of the location is detected with the aid of the sensor device of the vehicle, the element identifying an entrance location into the zone, a position of the element being detectable with the aid of a positioning device of the vehicle and being transmitted from the vehicle to the server.

In this way, it is thus advantageously known to the vehicle where exactly the zone begins, i.e., starting at which vehicle position the vehicle may be driven at least partially automated based on the navigation data. In addition to the position data, the element itself may also be searched in the vehicle surroundings. This is advantageous in particular when GPS signals are weak or not present at all.

In one further specific embodiment, it may be provided that an instantaneous vehicle position is transmitted to the server, which transmits to the vehicle only when the instantaneous vehicle position is situated at a predetermined distance from the location.

This means in particular that data are only transmitted to the vehicle when the vehicle is situated close enough to the location. This means in particular that this does not occur any earlier. A likelihood that the vehicle is in fact driving to the location and does not spontaneously change its driving route beforehand generally increases as the distance from the location itself decreases. In this way, it is advantageously possible to ensure that data are not superfluously transmitted to the vehicle. This may in particular advantageously save transmission time, transmission bandwidth, transmission capacity and/or transmission energy. Resources of the external server may thus advantageously be saved and, if needed, may be made available to further vehicles, which in fact also use them.

The wording "external server" refers to a server which is not included in the vehicles, but is formed separately from these. Communication between the vehicles and the server may in particular be carried out with the aid of wireless communication methods. For example, such wireless communication methods may include mobile radio communication methods and/or WLAN communication methods.

According to one further specific embodiment, it may be provided that the location corresponds to a destination of the driving route.

In this way, a driver may obtain information on whether or not such a zone is present at his/her planned destination, i.e., the destination, already before the drive, i.e., when planning his/her driving route. If necessary, he/she is thus able to change his/her destination in a timely manner. This may advantageously save time and avoid unnecessary detours. In the case of an internal combustion engine, this may advantageously save fuel, or in the case of an electric motor, it may save electric energy.

According to one further specific embodiment, it may be provided that the zone includes a parking area and/or an electric charging station.

In this way, at least partially automated parking and/or partially automated driving of the vehicle to a charging station is advantageously made possible.

A location which is assigned to a driving route of the vehicle refers in particular to a location which is located on or at this driving route. This may in particular be the destination or an intermediate location. The driving route of the vehicle refers in particular to the route of the vehicle which the vehicle will take. For example, such a driving route may be planned and/or provided with the aid of a navigation system.

A device which is configured to carry out the methods according to the present invention includes in particular a sensor device for detecting vehicle surroundings and/or a positioning device for determining an instantaneous vehicle position and/or for determining a position of an element in the vehicle surroundings and/or a communication device for communicating with an external server. Such a communication device includes in particular a transmitter and a receiver for sending and receiving data, in particular navigation data and/or sensor images and/or position data.

According to one specific embodiment, a sensor device may include one or multiple sensors, for example. The sensors may in particular be identical or preferably different. The sensors may be an ultrasonic sensor, a radar sensor, a video sensor or a LIDAR sensor, for example. The sensor device may in particular include a laser scanner. The sensor device may in particular include a video camera having one video sensor or multiple video sensors. The video camera may in particular be designed as a stereo video camera.

DETAILED DESCRIPTION OF THE INVENTION

Figure 1:
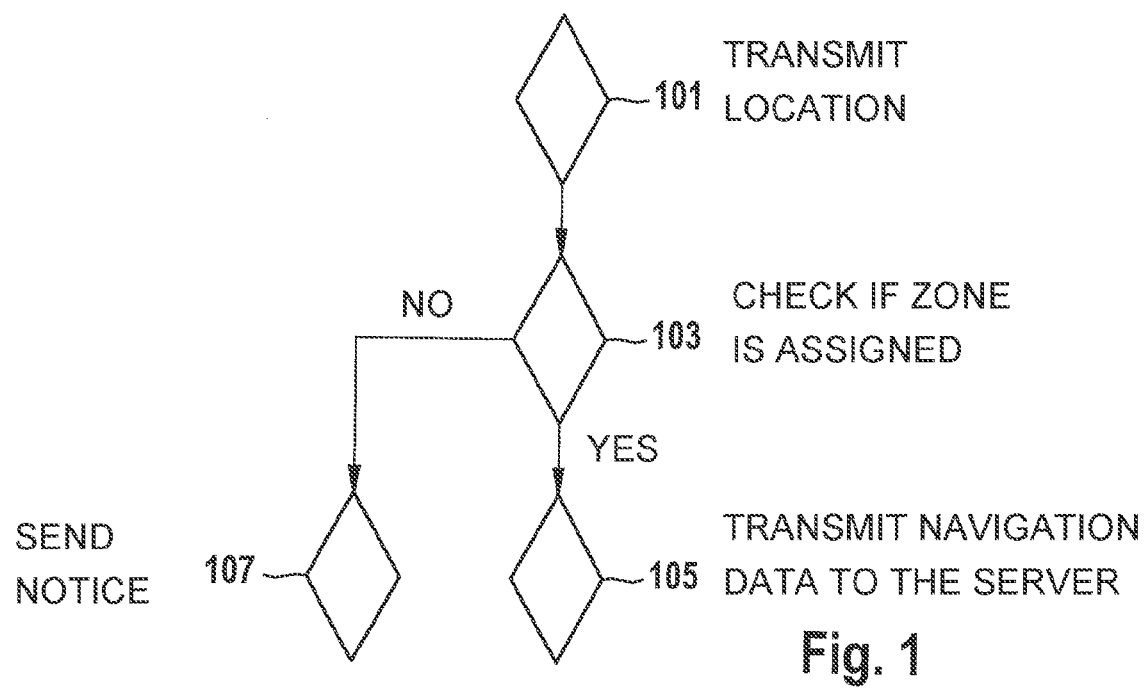
FIG. 1 shows a flow chart of a method for operating a vehicle.

Hereafter, identical reference numerals are used for identical features.

FIG. 1 shows a flow chart of a method for operating a vehicle.

According to a step 101, a location assigned to a driving route of the vehicle is transmitted from the vehicle to an external server. The server checks in a step 103 whether a zone is assigned to the transmitted location for which navigation data exist for at least partially automated vehicle driving within the zone. When this is the case, i.e., when such a zone is assigned to the transmitted location, the navigation data are transmitted from the server to the vehicle in a step 105. When such a zone is not present, a notification or a message is sent to the vehicle in a step 107 that such a zone is not present and/or that no corresponding navigation data for the location exist.

Figure 2:
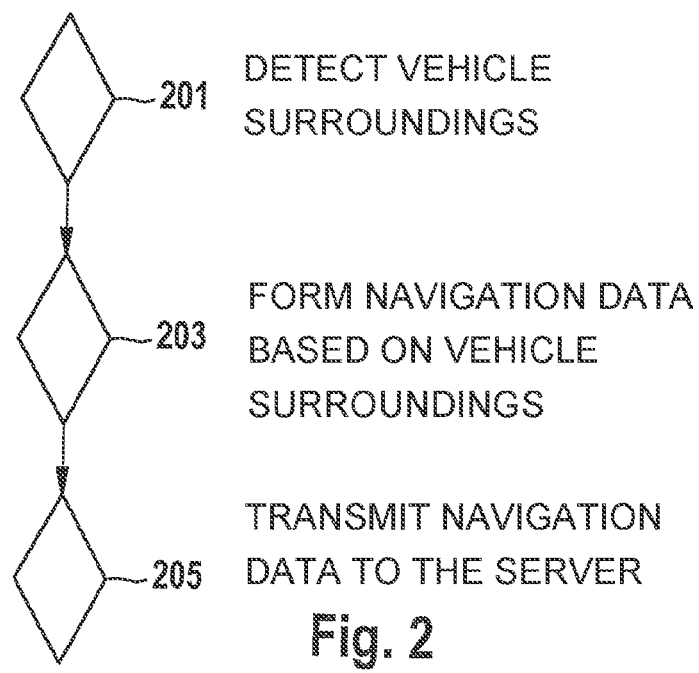
FIG. 2 shows a flow chart of a further method for operating a vehicle.

FIG. 2 shows a flow chart of a method for operating a vehicle, the vehicle including a sensor device for detecting vehicle surroundings.

In a step 201, the vehicle surroundings are detected with the aid of the sensor device while the vehicle is driving in a zone assigned to a location.

After the vehicle has driven within the zone, navigation data for at least partially automated vehicle driving within the zone are formed according to a step 203 based on the detected vehicle surroundings. These navigation data are transmitted from the vehicle to an external server according to a step 205.

Figure 3:
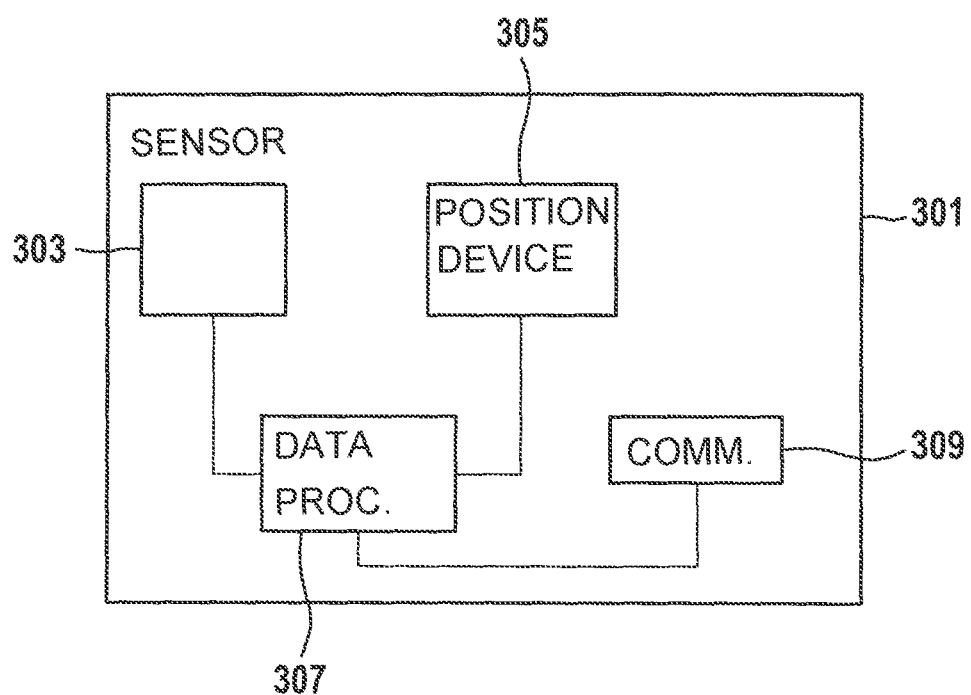
FIG. 3 shows a device for operating a vehicle.

FIG. 3 shows a device 301 for operating a vehicle. Device 301 is configured in particular to implement or carry out the method according to FIG. 1 and/or according to FIG. 2.

Device 301 includes a sensor device 303 for detecting vehicle surroundings. Device 301 moreover includes a positioning device 305. Positioning device 305 is in particular designed to determine an instantaneous vehicle position. In addition or as an alternative, positioning device 305 may in particular be designed to determine a position of an element in the vehicle surroundings, the element being detectable with the aid of sensor device 303, for example.

Device 301 furthermore includes a data processing device 307, for example a computer. Data processing device 307 is in particular designed to form navigation data for at least partially automated vehicle driving based on the detected vehicle surroundings and/or based on the determined positions. Data processing device 307 is in particular designed to compare sensor images to each other.

Device 301 moreover includes a communication device 309 for communicating with an external server which is not shown. Communication device 309 may in particular include a transmitter (not shown) and a receiver (not shown) for this purpose.

Figure 4:
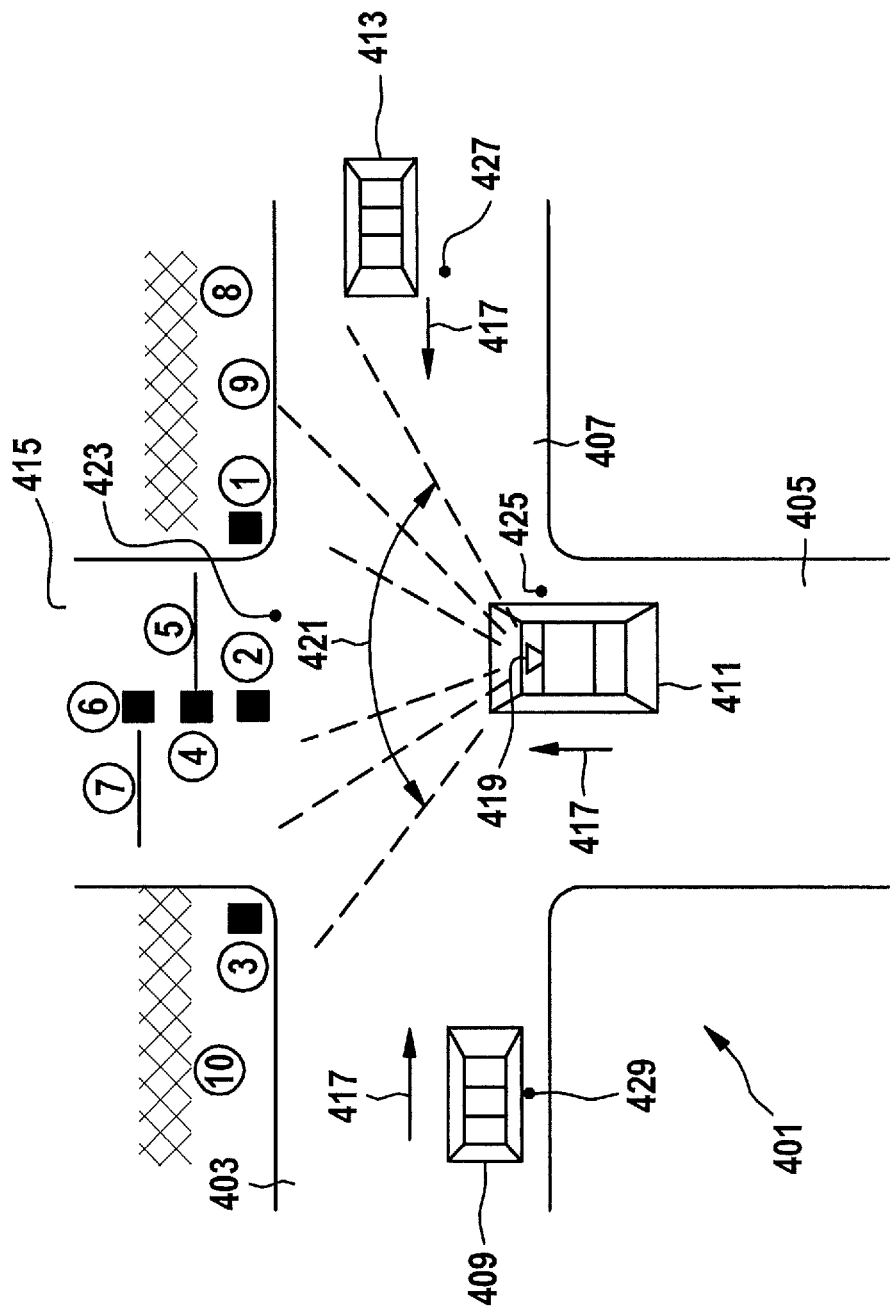
FIG. 4 shows an intersection.

FIG. 4 shows an intersection 401.

Directional information hereafter refers to the paper plane.

Intersection 401 has three roads 403, 405 and 407, which intersect. Road 403 approaches from the left, road 405 approaches from the bottom, and road 407 approaches from the right.

In addition, three vehicles 409, 411 and 413 are shown. Vehicle 409 is driving on road 403 from left to right. Vehicle 411 is driving on road 405 from bottom to top. Vehicle 413 is driving on road 407 from right to left.

A respective driving direction of vehicles 409, 411 and 413 is identified in each case with an arrow having reference numeral 417.

Reference numeral 415 identifies a parking area, for example a parking area within a parking garage. Parking area 415 is one example of a zone, which hereafter may also be referred to as the home zone. It is referred to this way since the term "home zone" has become established for this technical field.

Vehicle 411 includes a sensor device 419, which is designed to detect vehicle surroundings. A detection angle of sensor device 419 is identified with a double arrow having reference numeral 421.

While this is not explicitly shown, vehicles 409 and 413 in each case also include a sensor device for detecting vehicle surroundings. It is also not shown that each vehicle includes a communication device for communicating with an external server.

Reference numeral 423 identifies a position (also called the starting position or entrance location) which marks the start of parking area 415.

Reference numeral 425 identifies a position from which vehicle 411 approaches position 423. Reference numeral 427 accordingly identifies a position from which vehicle 413 approaches starting position 423 of zone 415. Reference numeral 429 accordingly identifies a position from which vehicle 409 approaches starting position 423.

Position 425 may also be abbreviated or referred to hereafter as follows: Pos 1. Position 427 may be abbreviated or referred to hereafter as Pos 2. Position 429 may also be referred to or abbreviated hereafter as Pos 3. Position 423 may also be referred to or abbreviated hereafter as Pos 4.

The surroundings of intersection 401 furthermore show multiple elements or objects, which in each case are consecutively numbered from 1 through 10, the numbers in each case being circled. For example, these elements may be a trash can, a hydrant, a mailbox or arbitrary other objects, which are usually situated in intersection surroundings.

Elements 4 and 5, as well as 6 and 7, in each case denote a barrier, which can block or clear an entrance (elements 4 and 5) or an exit (elements 6 and 7) of zone 415.

Individual elements 1 through 10 may also be referred to hereafter as landmarks. They are referred to this way since this term has become established in this technical field.

One specific embodiment of the method is described in greater detail hereafter based on intersection 401 shown in FIG. 4, having three vehicles 409, 411 and 413.

With the aid of sensor device 419 and its detection range or detection angle 421, vehicle 411 recognizes a home zone 415. Home zones are generally recognized by the so-called landmarks. Landmarks 1 through 10 shown in FIG. 4 result in a characteristic pattern/image (sensor image) and identify the start of adjoining home zone 415. An "X" may be used as a placeholder for the numbering of the landmarks.

The method includes in particular the following steps:

1. The landmarks of home zone 415, in combination with the present or instantaneous vehicle position, are transmitted to an external server and/or a social network service (the external server may provide such a social network service, for example) via a data connection.
2. The determined GPS position (instantaneous vehicle position) is stored at the point in time when a landmark X is detected (with the aid of the sensor device).
3. These may be different pieces of position information, depending on how a landmark X is approached. The perspective of landmark X is accordingly also different (FIG. 4: Pos 1 through Pos 3).
4. The ending position (FIG. 4, Pos 4) at a landmark X is also stored and transferred or transmitted to the external server and/or to the social network service (which may provide a social network, for example). This means in particular that Pos 4 is the last GPS position before home zone 415 begins (i.e., before the processes trained according to a training drive with respect to vehicle driving start in an automated fashion).
5. This creates a correlation between landmark X from different starting positions and a destination position of landmark X, i.e., regardless of the directions from which a vehicle approaches landmarks 1 through 10 in FIG. 4, the home zone always begins just in front of barriers 4, 5 and 6, 7. When a vehicle approaches from the opposing road, all landmarks 1 through 10 are detected in position Pos 1 (shown symbolically by vehicle 411). When the vehicle approaches via position Pos 2 (shown symbolically by vehicle 413), only landmarks 8, 9, 1, 2, 4 and 5 are directly detected. When the vehicle approaches from position Pos 3, then it is only landmarks 10, 3, 2, 4 (shown symbolically by vehicle 409) which are detected directly. The landmarks detected in accordance with the different positions depend in each case on the possible detection angles 421 of the vehicles. Each time, the approach ends in position Pos 4 in front of barrier 4, 5 and 6, 7, where home zone 415 begins.

6. Users of the social network and/or of the external server have access to stored landmarks X (including starting and ending positions).
7. A vehicle may detect and store multiple such landmarks on additional home zones—landmarks X1 through Xn (n=number of the landmarks). This is done in each case in combination with the GPS position of the vehicle (instantaneous vehicle position) at the point in time of the landmark detection and of the ending position at the beginning of home zone 415.
8. All these landmarks are sent and stored via the external server and/or via the social network and made available to other users or drivers of a vehicle.
9. After successful storage of a landmark X, a vehicle according to this method also transfers the entire drive (in particular the drive within home zone 415, i.e., in particular the navigation data) to the external server and/or to the social network, so that these pieces of information are accessible for other users of this service and/or of the external server.
10. A second vehicle (not shown in FIG. 4) including the same technology and participation in the external server or the social network now approaches home zone 415, identified by positions Pos 1 through Pos 3 and ending position Pos 4.
11. The second vehicle itself has never passed through or trained home zone 415—i.e., does not know the conditions in home zone 415.
12. Starting at points in time Pos 1 through Pos 3, home zone 415 of the first vehicle is recognized/compared via the external server and/or the social network (i.e., the navigation data are transmitted to the second vehicle) and loaded into the second vehicle.
13. Starting at Pos 4, the second vehicle is now able to implement loaded home zone 415 from the first vehicle, i.e., it is able to pass through home zone 415 itself in an automated fashion.

Through the vehicle population and growing significance of the technologies, the availability of home zones, together with their landmarks, in the data service will multiply very quickly, and the coverage of home zones for this service will grow. This will increase an attractiveness and availability of the application and end customer benefits for arbitrary locations.

The applicability for rental car fleets or car2go concepts provides additional advantages in this regard, and may offer high added value in the business model—valet parking (automated parking) in arbitrary parking areas which are identified by landmarks will be implemented.

This is significant for the named vehicle fleets (rental car fleets; however, not limited only to rental car fleets, but also usable for arbitrary vehicle fleets), in particular when the vehicle fleet includes electric vehicles, since the method is able to drastically simplify the operation related to a charging station for electric vehicles. The reason for this is that, with the aid of the method according to the present invention, such an electric vehicle is able to drive to arbitrary charging stations in a fixed area or in a zone (home zone) as soon as it is identified by a landmark—and if at least one vehicle of this fleet has previously trained for the home zone with the method and stored it, and transmitted it to the external server.

What is claimed is:

1. A method for operating a vehicle, the method comprising:
    transmitting, from the vehicle to an external server, a location assigned to a driving route of the vehicle;
    checking, by the server, whether a zone is assigned to the transmitted location for which navigation data exist for at least partially automated vehicle driving within the zone; and
    transmitting, via the server, the navigation data from the server to the vehicle when such a zone is assigned to the transmitted location; and
    operating, based on the transmitted data, the vehicle in at least a partially autonomous manner in the zone without the vehicle previously having completed a training drive in the zone, wherein if the zone is not present and/or no corresponding navigation data for the location exists, a notification or a message is sent to the vehicle that the zone is not present and/or that no corresponding navigation data for the location exists;
    wherein when planning a driving route, a driver of the vehicle obtains information on whether the zone is present at a planned destination, and if necessary, the driver is able to change the destination so as to save at least one of driving time, an unnecessary detour, fuel in the case of an internal combustion engine, and electric energy in the case of an electric motor.

2. The method as recited in claim 1, further comprising:
    transmitting by the server a sensor image of surroundings of the location to the vehicle;
    comparing a reference sensor image of vehicle surroundings recorded with the aid of a sensor device to the transmitted sensor image; and
    detecting, based on the comparison, when the vehicle is situated in the surroundings of the location.

3. The method as recited in claim 2, wherein the transmitted sensor image includes an item of information regarding the direction, relative to the location, from which the transmitted sensor image was recorded, the item of information being used during the comparison.

4. The method as recited in claim 2, wherein the server transmits a position of an element in the surroundings of the location to the vehicle, the element identifying an entrance location into the zone.

5. The method as recited in claim 2, wherein an instantaneous vehicle position is transmitted to the server, which transmits to the vehicle only when the instantaneous vehicle position is situated at a predetermined distance from the location.

6. The method as recited in claim 5, wherein the location corresponds to a destination of the driving route.

7. The method as recited in claim 2, wherein the zone includes at least one of a parking area and an electric charging station.

8. A non-transitory computer-readable data storage medium storing a computer program, which is executable on a processor, comprising:
    a program code arrangement having program code for operating a vehicle, by performing the following:

transmitting, from the vehicle to an external server, a location assigned to a driving route of the vehicle;
checking, by the server, whether a zone is assigned to the transmitted location for which navigation data exist for at least partially automated vehicle driving within the zone;
transmitting, via the server, the navigation data from the server to the vehicle when such a zone is assigned to the transmitted location; and
operating, based on the transmitted data, the vehicle in at least a partially autonomous manner in the zone without the vehicle previously having completed a training drive in the zone, wherein if the zone is not present and/or no corresponding navigation data for the location exists, a notification or a message is sent to the vehicle that the zone is not present and/or that no corresponding navigation data for the location exists;
wherein when planning a driving route, a driver of the vehicle obtains information on whether the zone is present at a planned destination, and if necessary, the driver is able to change the destination so as to save at least one of driving time, an unnecessary detour, fuel in the case of an internal combustion engine, and electric energy in the case of an electric motor.

* * * * *